(12) United States Patent
Eisenberg

(10) Patent No.: US 8,777,580 B2
(45) Date of Patent: Jul. 15, 2014

(54) SECONDARY AIRFOIL MOUNTED ON STALL FENCE ON WIND TURBINE BLADE

(75) Inventor: Drew Eisenberg, Boulder, CO (US)

(73) Assignee: Siemens Aktiengesellschaft, München (DE)

(*) Notice: Subject to any disclaimer, the term of this patent is extended or adjusted under 35 U.S.C. 154(b) by 49 days.

(21) Appl. No.: 13/287,249

(22) Filed: Nov. 2, 2011

(65) Prior Publication Data

US 2012/0051936 A1  Mar. 1, 2012

(51) Int. Cl.
*F03D 11/00* (2006.01)

(52) U.S. Cl.
USPC ........................ 416/239; 416/244 R

(58) Field of Classification Search
USPC ............... 416/23, 203, 228, 236 R, 175, 239, 416/244 R
See application file for complete search history.

(56) References Cited

U.S. PATENT DOCUMENTS

| | | | | |
|---|---|---|---|---|
| 2,135,887 | A * | 11/1938 | Fairey | 416/23 |
| 4,687,416 | A * | 8/1987 | Spranger | 416/223 A |
| 5,056,741 | A * | 10/1991 | Bliesner et al. | 244/214 |
| 5,484,257 | A * | 1/1996 | Osborn | 415/2.1 |
| 7,234,921 | B2 * | 6/2007 | Shchukin et al. | 416/1 |
| 7,520,722 | B2 * | 4/2009 | Schukin et al. | 416/1 |
| 7,585,157 | B2 | 9/2009 | Quell et al. | |
| 7,828,523 | B2 * | 11/2010 | Bonnet | 416/1 |
| 2009/0180889 | A1 * | 7/2009 | Stiesdal | 416/223 R |
| 2009/0232656 | A1 * | 9/2009 | Grabau | 416/223 R |
| 2010/0143152 | A1 | 6/2010 | Subramanian et al. | |
| 2010/0209258 | A1 * | 8/2010 | Fuglsang et al. | 416/90 R |
| 2011/0020128 | A1 * | 1/2011 | Fuglsang et al. | 416/223 A |
| 2011/0206509 | A1 * | 8/2011 | Benito Santiago et al. | 416/23 |

FOREIGN PATENT DOCUMENTS

| | | | | |
|---|---|---|---|---|
| CN | 2425447 | A1 * | 10/2004 | F03D 11/00 |
| DE | 202008006801 | U1 | 4/2009 | |
| EP | 2078852 | A2 | 7/2009 | |
| JP | 61167175 | A * | 7/1986 | F03D 1/06 |
| NL | 1035525 | | 7/2008 | |
| WO | 2007105174 | A1 | 9/2007 | |
| WO | 2007114698 | A2 | 10/2007 | |
| WO | 2009146810 | A2 | 12/2009 | |
| WO | 2010133584 | A1 | 11/2010 | |
| WO | 2010133585 | A1 | 11/2010 | |
| WO | 2010133587 | A1 | 11/2010 | |

(Continued)

OTHER PUBLICATIONS

Gaunaa, M., Sorensen, N, and Bak, C. "Thick Multiple Element Airfoils for use on the Inner Part of Wind Turbine Rotors" Torque: 2010. pp. 135-152, 2010, EWEA.

(Continued)

*Primary Examiner* — Nathaniel Wiehe
*Assistant Examiner* — Sean J Younger

(57) ABSTRACT

An airfoil (26, 62, 64) is mounted on a chordwise stall fence (28) of a wind turbine blade (22). The airfoil may be an aerodynamic slat (26) positioned over a forward portion of the suction side (38) of the blade or a flap (63) disposed near a trailing edge (34) of the blade. The stall fence may be at least as high as the thickness of the boundary layer (39) of air passing over the blade. The slat or flap may be twisted between an inboard end (26A) and an outboard end (26B) to compensate for the radially varying angle of the relative air inflow (46A, 46B).

18 Claims, 6 Drawing Sheets

(56) References Cited

FOREIGN PATENT DOCUMENTS

| | | | | |
|---|---|---|---|---|
| WO | 2010133591 | A1 | 11/2010 | |
| WO | 2010133594 | A1 | 11/2010 | |
| WO | 2010133649 | A2 | 11/2010 | |
| WO | WO 2010133649 | A2 * | 11/2010 | ............... F03D 1/06 |
| WO | 2010145902 | A1 | 12/2010 | |

OTHER PUBLICATIONS

Chow, Raymond and Van Dam, C.P. "Inboard Stall and Separation Mitigation Techniques on Wind Turbine Rotors" 49th AIAA Aerospace Sciences Meeting. Jan. 4-7, 2011.

Heinzelmann, B., Gollnick, B. Thamsen, P., Petsche, P. and Christiansen, J. "Investigations into Boundary Layer Fences in the Hub Area of Wind Turbine Blades". EWEC 2008.

* cited by examiner

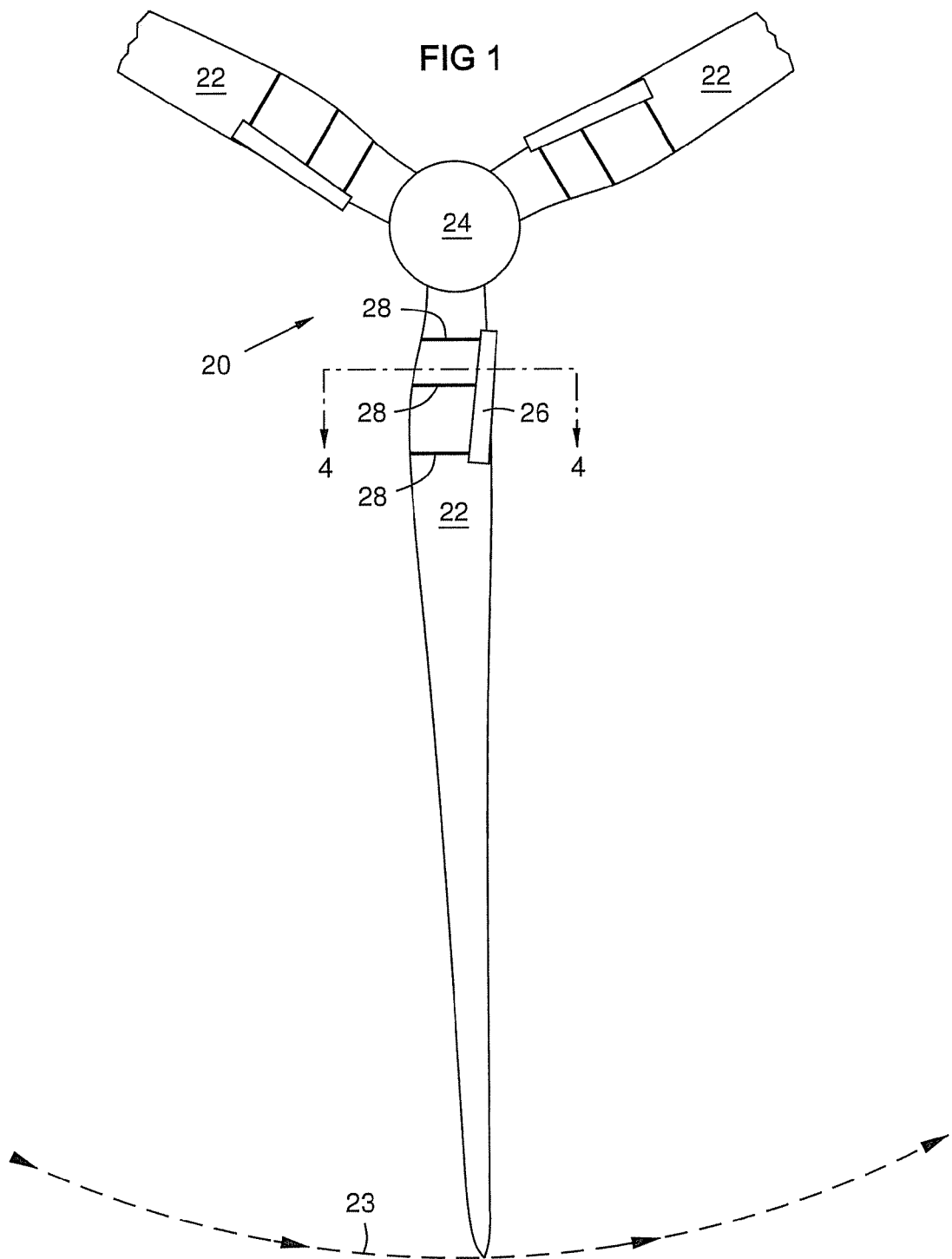

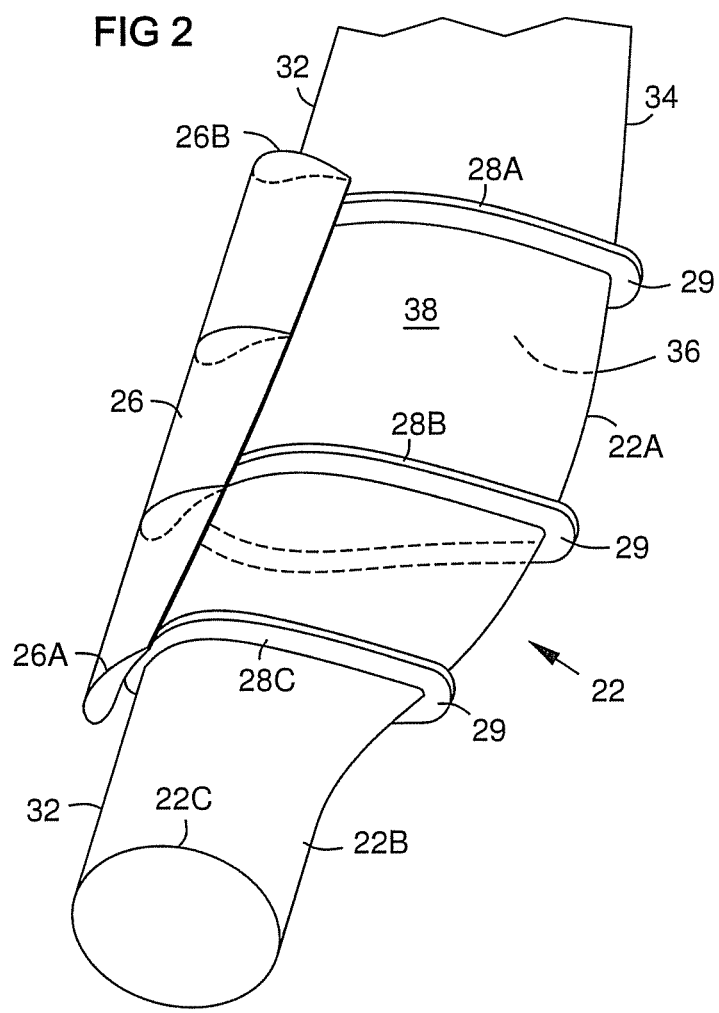

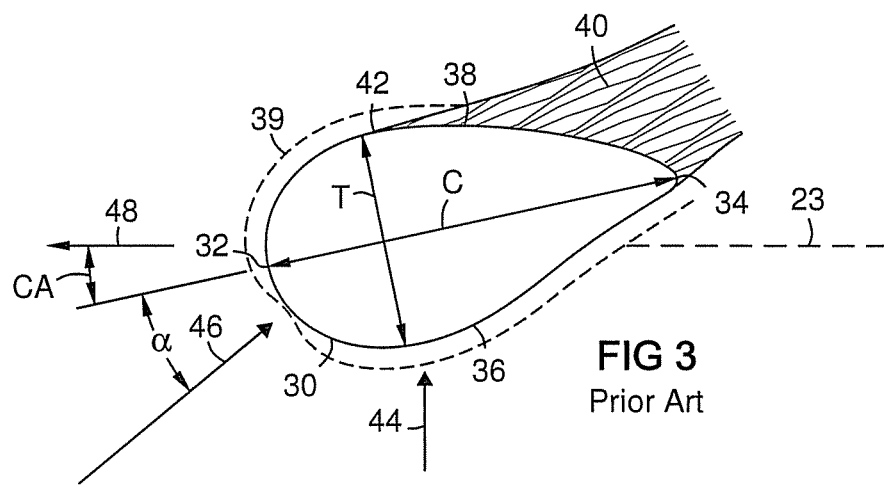
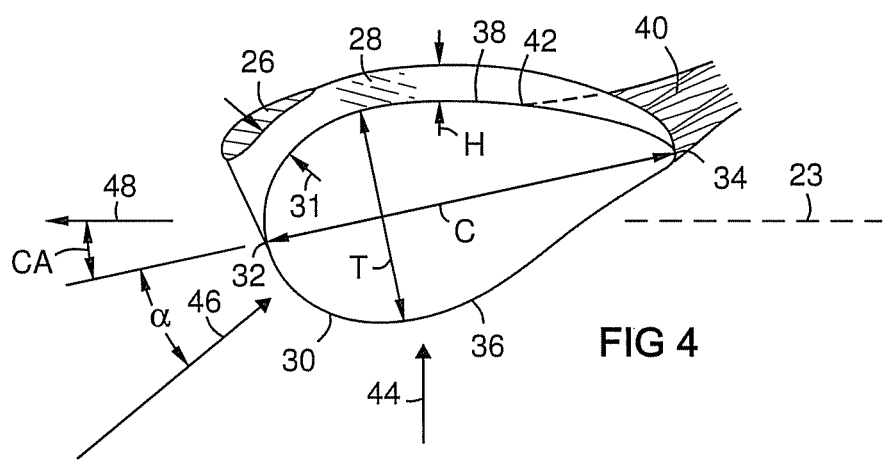
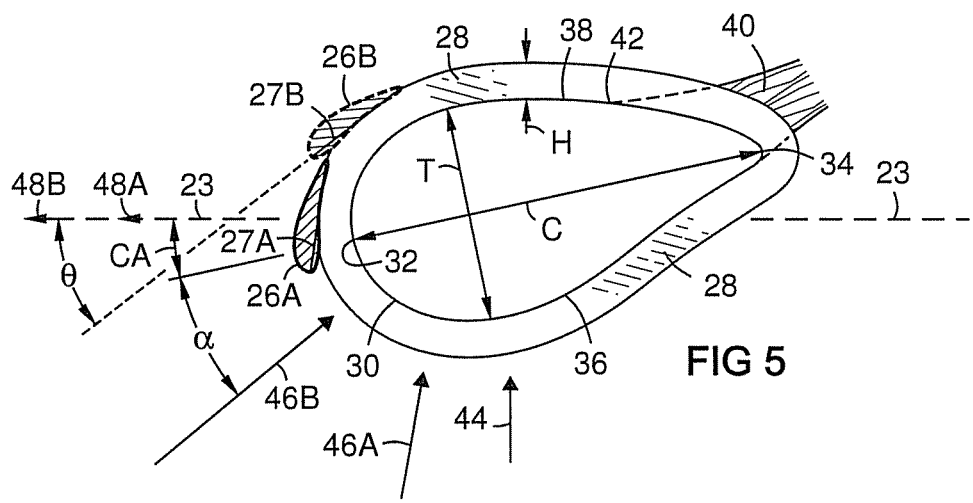

SECONDARY AIRFOIL MOUNTED ON STALL FENCE ON WIND TURBINE BLADE

FIELD OF THE INVENTION

The invention relates generally to wind turbines and more particularly to a blade for a wind turbine.

BACKGROUND OF THE INVENTION

The inboard portion of a wind turbine blade is made thick to support thrust and lift loads that are cantilevered onto the blade root by the outboard blade regions. Herein "inboard" means radially inward toward the blade root, which is the portion of the blade connected to the hub. "Outboard" means radially outward, or toward the blade tip. The inboard portion of each blade becomes progressively thicker (perpendicular to the airfoil chord) toward the hub for strength, and typically becomes cylindrical adjacent to the hub to facilitate mounting and interface with a blade pitch adjustment mechanism. The relative air inflow angle changes with distance from the rotation center due to the increasing blade speed relative to the incoming wind. For manufacturing reasons, the chord angle or twist angle of the blade cannot change fast enough near the root to provide the optimal orientation of the blade airfoil section to the relative air inflow direction, resulting in an increasingly excessive angle of attack proximate the root. Due to the blade thickness and high attack angle, the inboard portion of the blade may be permanently stalled, reducing the wind energy conversion efficiency. Herein "attack angle" means the angle between the airfoil chord line and the relative wind vector, taking the blade rotation into account. A stalled condition occurs when air passing over the suction side of the airfoil detaches from the surface of the blade, creating a separated region.

The separated region on the suction side of the blade is slow-moving air, and is accelerated radially outward due to the rotation of the blade. This detached turbulent air is thus pumped outward, and induces or enlarges a separated region on adjacent portions of the blade. To mitigate this outward flow, a barrier known as a stall fence or a boundary layer fence may be placed on the suction side of the blade. Such fences block the radially outward growth and flow of the separated region, thus allowing outboard portions of flow to remain attached longer to the blade, producing more power.

BRIEF DESCRIPTION OF THE DRAWINGS

The invention is explained in the following description in view of the drawings that show:

FIG. 1 is a suction side view of a wind turbine rotor according to an embodiment of the invention as viewed from behind the rotor or from downwind of it.

FIG. 2 is a perspective view of an inboard portion of a wind turbine blade according to an embodiment of the invention.

FIG. 3 is a schematic sectional view of a thick airfoil showing a separated region as in the prior art.

FIG. 4 is view taken along line 4-4 of FIG. 1 illustrating an embodiment of the invention.

FIG. 5 is view as in FIG. 4 showing sections of two ends of a twisted and rotated slat, and also illustrating a slat fence that encircles the primary airfoil.

DETAILED DESCRIPTION OF THE INVENTION

Figure 6:
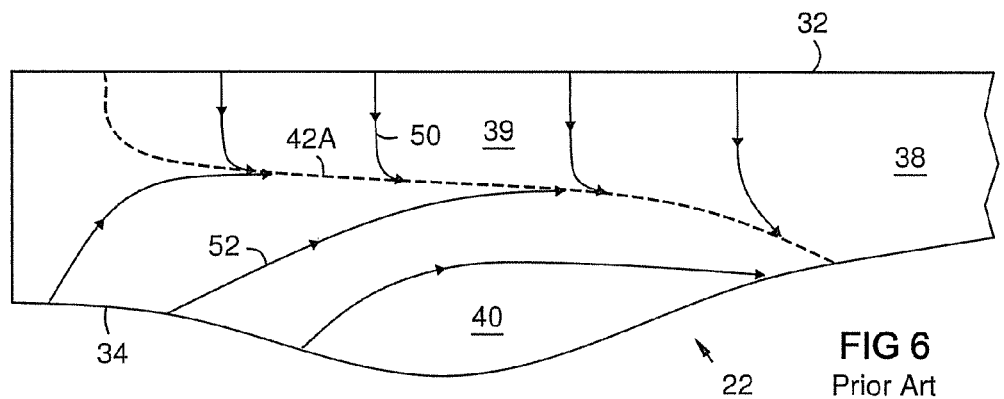
FIG. 6 is a schematic suction side view of an inboard portion of a prior art wind turbine blade with airflow lines.

Known stall fence designs are effective in limiting the outboard propagation of radially flowing air from the stalled region of a wind turbine blade. Leading edge suction side slats may be mounted as secondary airfoils on the inboard section of a wind turbine blade with clearance over the forward suction side of the blade to add lift and to accelerate the boundary layer over the suction side of the airfoil, thus pushing the stall boundary aft toward the trailing edge and increasing the lift of the thick blade cross sections. The slat also creates lift itself. Slats could be attached to the blade with struts that extend from the airfoil. The inventors have recognized, however, that all slat attachments produce drag and airflow momentum deficits that decrease power production.

FIG. 1 shows a wind turbine rotor 20 with rotating radially-oriented airfoils or blades 22 that rotate generally in a plane 23 or disc of rotation. Only rotating components are illustrated in this figure, with the nacelle and tower not being illustrated. Each blade extends from a common hub 24. Each blade may have an aerodynamic forward slat 26 mounted above an inboard portion of each blade 22. The blade may also have one or a plurality of chordwise stall fences 28 disposed on the inboard portion of each blade 22.

FIG. 2 is a perspective view of an inboard portion of a wind turbine blade 22. The blade includes a main element with a maximum chord length at a given radial position 22A, and a shorter chord length at positions radially further inward from position 22A and approaching position 22B where the chord length of the inboard portion of the main element is at a minimum. The inboard end of the blade may be cylindrical 22C. Three stall fences 28A-C are shown, two of which, 28A and 28B, may bracket the blade maximum 22A, and a third one 28C may be further inward. However, other fence positions and numbers are also suitable. In this embodiment, a forward slat 26 is mounted across two or more of the stall fences 28A-C. One or more of the stall fences 28A-C may extend over most or all of both the pressure side 36 and the suction side 38, as shown by fence 28B. The stall fences may include a rearward portion 29 extending behind the trailing edge 34. This places the trailing edge wake of the fence behind the blade 22. The stall fence may wrap around the leading edge 32 and/or the trailing edge 34 as shown.

The stall fences may be attached to the blade by techniques known in the art, such as with a fastener extending to a spar member of the blade. The slat may be mounted directly to the fences, or alternatively, through the fences directly to a spar member of the blade. By utilizing at least one fence as a mount for a slat, the need for a separate strut to support the slat at that location is eliminated, and the benefits of both a fence and a slat are achieved. Furthermore, there is a mutual benefit or synergy in this arrangement, because the flow momentum penalty of the fence is reduced by the acceleration provided by the slat, as described in more detail below with reference to FIGS. 9-11. In another embodiment a slat may be supported by one or more stall fences at a position(s) where the aerodynamic benefit of a stall fence is relatively greater, and by one or more struts at other position(s) where the aerodynamic benefit of a stall fence is relatively less. For example, a slat may be supported by a stall fence at a first location and by a strut at a more inboard position where the rotational speed of the blade is lower, since a strut may be less expensive than a stall fence. Alternatively, a slat may be supported by a stall fence at a first location within a separated flow region and be extended outboard past the separated flow region where it is supported by a strut where there is no outward flow and a stall fence is not needed.

The slat 26 may twist along its radial length to accommodate the changing angle of the air inflow 46A, 46B (FIG. 5), which varies with radius due to the corresponding change in circumferential velocity. The slat may also rotate forward over the front end of the airfoil with decreasing radial distance from the hub 24. Accordingly, the inboard end 28A of the slat may be positioned more toward or over the leading edge 32 of the blade 22, and the outboard end 28B may be positioned farther back from the leading edge 32.

FIG. 3 shows the geometry of an airfoil section 30 at an inboard portion of a wind turbine blade, showing the separated region 40 for a conventional blade arrangement. The airfoil has a leading edge 32; a trailing edge 34; a pressure side 36; a suction side 38; a chord length C between the leading and trailing edges 32, 34; and a maximum thickness T. On wind turbines, the pressure side 36 spans between the leading and trailing edges 32, 34 on the windward/upwind side of the airfoil 30. The suction side 38 spans between the leading and trailing edges 32, 34 on the downwind side of the airfoil 30. A relative inflow vector 46 results from the wind vector 44 and the blade rotation 48. An angle of attack $\alpha$ is measured between the chord line C and the relative inflow vector 46. This geometry is exemplary of a thick airfoil section on the inboard portion of a wind turbine blade 22. The separated region 40 has a separation line 42 on the suction side 38. An unseparated laminar boundary layer 39 is shown where the airflow is not separated from the airfoil 30. The airfoil may have a chord line orientation angle CA between the chord line C and the rotation plane 23.

FIG. 4 shows the geometry of an airfoil section 30 taken along line 4-4 of FIG. 1, with an aerodynamic slat 26 mounted across a stall fence 28 in accordance with an embodiment of the invention. The separation line 42 is moved aft and the separation region 40 is reduced in size on the airfoil 30 compared to FIG. 3. The slat 26 and stall fences 28 also cooperate to reduce the radial extent of the separation line 42 as later shown, thus benefiting the radially adjacent sections of the blade.

The stall fence 28 may extend over most or all of the chordwise length of the suction side 38. The median height H of the stall fence may be at least the height of the unseparated boundary layer 39 on the suction side 38, which may be calculated as 99% of the distance from the surface to the mean free stream velocity location in unseparated flow conditions. Alternately, the median height H of the stall fence 28 may be at least 1%, or at least 2%, of a selected chord length C of the airfoil. The selected chord length may be the chord length of the blade 22 at the stall fence. The stall fence 28 may change or gradually taper in height from front to back, such that it provides an optimum slat-to-blade clearance 31 and a reduced profile elsewhere. Exemplary slat clearances 31 may range from about 4-12% of the selected chord length C. In one embodiment, the stall fence may have a median height of 2-8% of the selected chord length, and the stall fence may have a height under the slat of 4-12% of the selected chord length.

FIG. 5 shows two ends 26A, 26B of a twisted slat 26 as also seen in FIG. 2. Each end 26A, 26B has a respective chord line 27A 27B that is adapted to a respective direction of the relative air inflow 46A 46B, which varies with tangential velocities 48A, 48B of the blade, based on radial position. The outboard end 26B of the slat 26 may have a chord line orientation angle $\theta$ of smaller magnitude relative to the plane of rotation 23 than the chord line orientation angle $\theta$ of an inboard end 26A of the slat. Optionally, the stall fence 28 may wrap around the airfoil 30 as shown, and may extend over most or all of both the suction and pressure sides of the main element airfoil 30. It may extend forward and/or behind the airfoil 30 as shown. The chords 27A, 27B of each section along the slat may form a chord line orientation angle $\theta$ relative to the rotation plane 23 that varies based on the radius.

Figure 7:
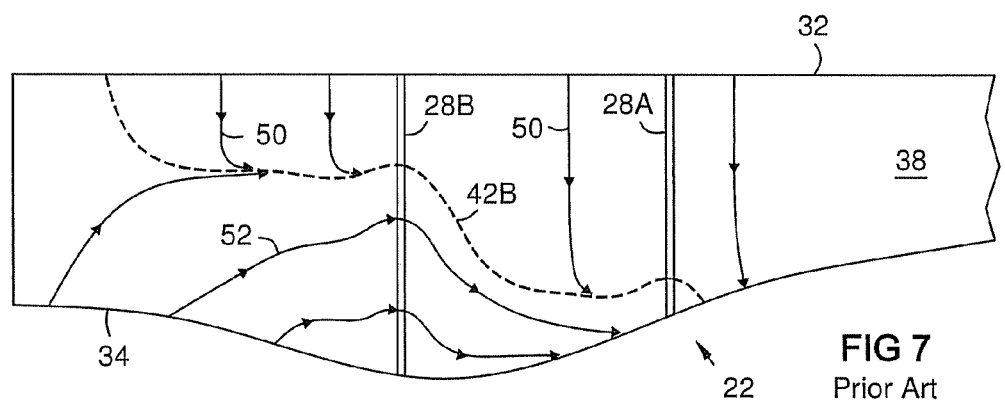
FIG. 7 is a view as in FIG. 6 modified with two chordwise stall fences.
Figure 8:
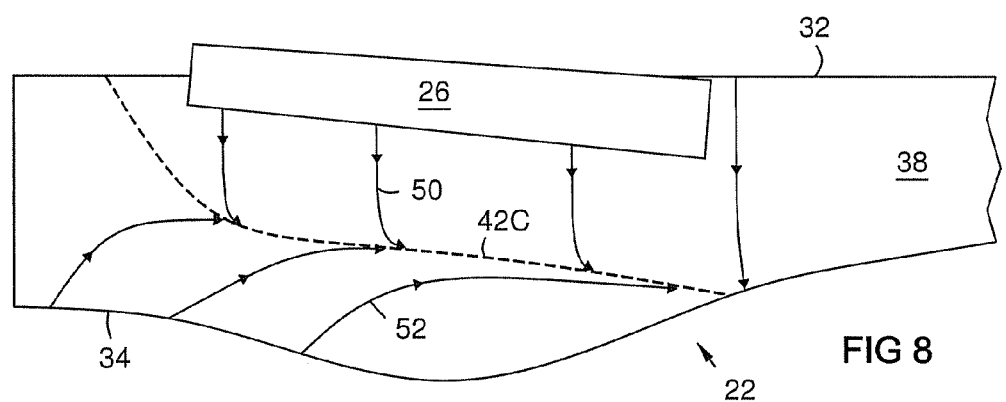
FIG. 8 is a view as in FIG. 6 modified with a forward slat.
Figure 9:
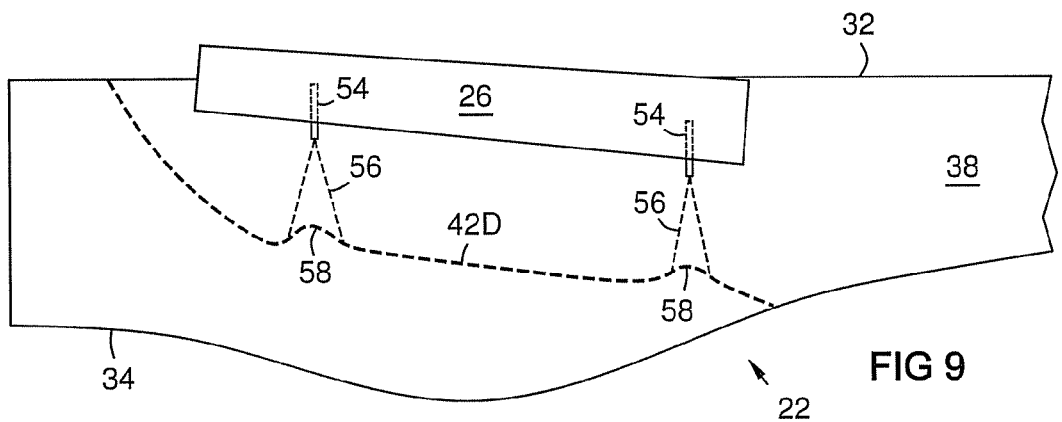
FIG. 9 is a view similar to FIG. 8 showing momentum deficits in the wakes of slat mounting struts.

FIGS. 6-11 schematically show an inboard portion of a suction side 38 of a wind turbine blade 22 with flow lines 50 of the unseparated region 39, flow lines 52 of the separated region 40, and the separation lines 42A-42E between them. FIG. 6 shows an unmodified prior art blade with stall separation line 42A. FIG. 7 shows a blade 22 with two stall fences 28A and 28B and a separation line 42B. FIG. 8 shows a blade 22 with a twisted slat 26, ignoring aerodynamic effects of its mounting attachments, and with a separation line 42C. FIG. 9 shows a blade 22 with a twisted slat 26 mounted on struts 54 that produce wakes 56 resulting in detrimental effects 58 on the separation line 42D.

Figure 10:
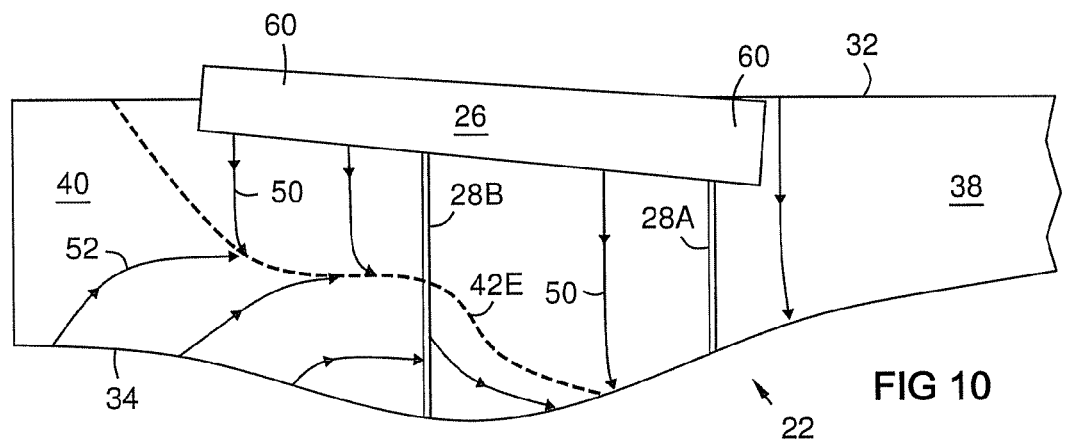
FIG. 10 is a view as in FIG. 6 modified with a forward slat mounted across two chordwise stall fences.
Figure 11:
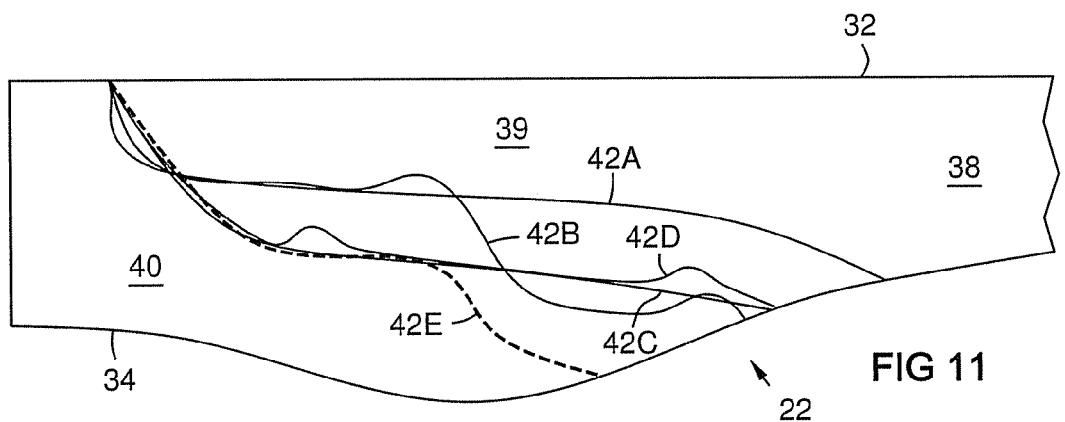
FIG. 11 shows all the separation boundary lines of FIGS. 6-10 for comparison.

FIG. 10 shows a blade 22 with a forward slat 26 mounted across two stall fences 28A, 28B. The separation line 42E shows additive effects of the slat 26 plus the fences 28A, 28B, which produce both a smaller and more radially limited separation region 40 than any of the configurations of FIGS. 6-9. The slat 26 accelerates the flow over the suction side 38, pushing the separation line 42E back. The flow acceleration created by the slat 26 on both sides of each fence 28A-B minimizes wake effects from the front and sides of the fences 28A-B. In one embodiment, the slat may extend 60 beyond the fences in both radial directions by at least the median height H of the fences, while in other embodiments the stall fence may end at the end of the slat. FIG. 11 shows the various separation lines 42A-E of FIGS. 6-10 on the same figure for comparison.

Figure 12:
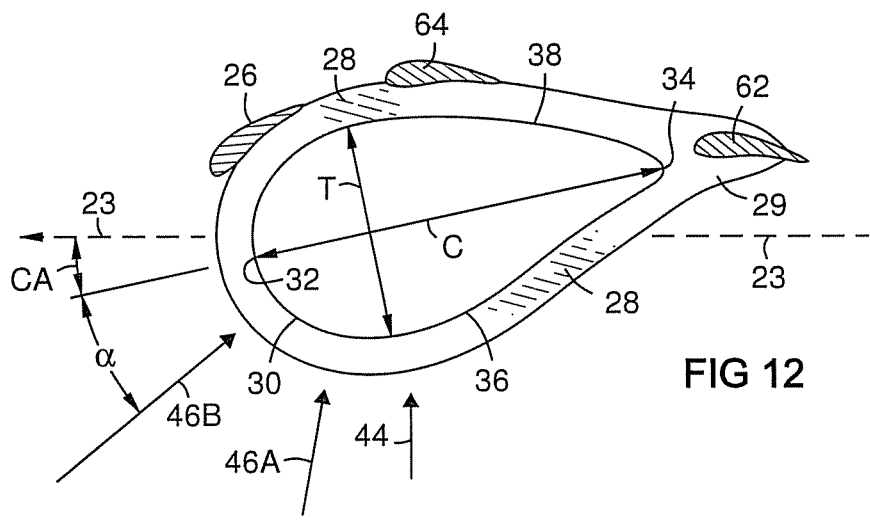
FIG. 12 shows alternate or additional positions for secondary airfoils, including an intermediate airfoil and a trailing edge flap.

FIG. 12 shows a portion of a wind turbine blade including a main element airfoil 30 with a slat 26 mounted forward on a fence 28 as previously described. Alternate or additional secondary airfoils 62, 64 may be mounted on the fence 28 at other positions. A flap 62 may be mounted on an aft portion 29 of the fence 28 at least partially or completely aft of the trailing edge 34 of the airfoil 30. An intermediate airfoil 64 may alternately or additionally be mounted at or proximate an intermediate or midway position of the chord C, for acceleration and lift benefits similar to the forward slat 26. The intermediate airfoil 64 may have a twist along its radial length similar to the forward slat 26, but to a lesser degree. If both a forward slat 26 and an intermediate airfoil 64 are provided, the intermediate airfoil 64 may be generally parallel to the forward slat, or they may diverge from each other toward their inboard ends. Regardless of the location of the one or more secondary airfoil (26, 64 and/or 62), its support on a fence 28 provides synergistic advantages not previously recognized in the art.

Figure 13:
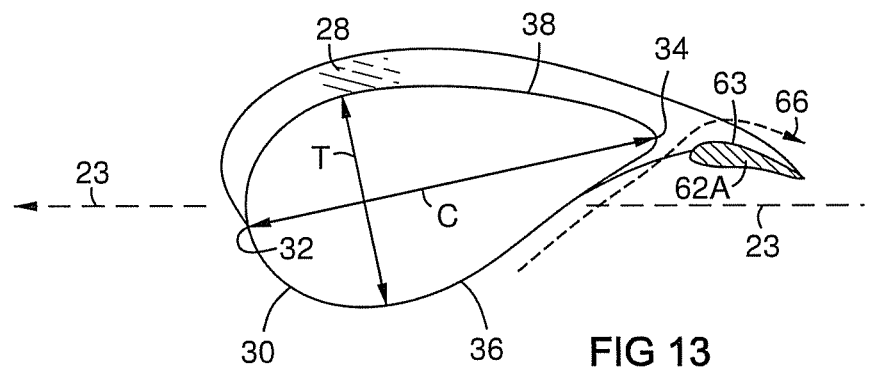
FIG. 13 shows a sectional view of a main element airfoil with a suction side stall fence that supports a trailing edge flap.

FIG. 13 shows a portion of a wind turbine blade including a main element airfoil 30 with a suction side stall fence 28 that extends aft of the trailing edge 34 and supports a flap 62A at a distance behind and below the trailing edge 34. A portion of airflow 66 flows from the pressure side 36 of the main airfoil to the suction side 63 of the flap 62A. The flow acceleration around the suction side of the flap reduces flow recirculation from the pressure side 36 around the trailing edge 34 to the suction side 38 of the main airfoil. Such recirculation supports an adverse pressure gradient on the suction side 38 that promotes boundary layer separation. The less separation, the more efficient the stall fences are, and the smaller they need to be.

Figure 14:
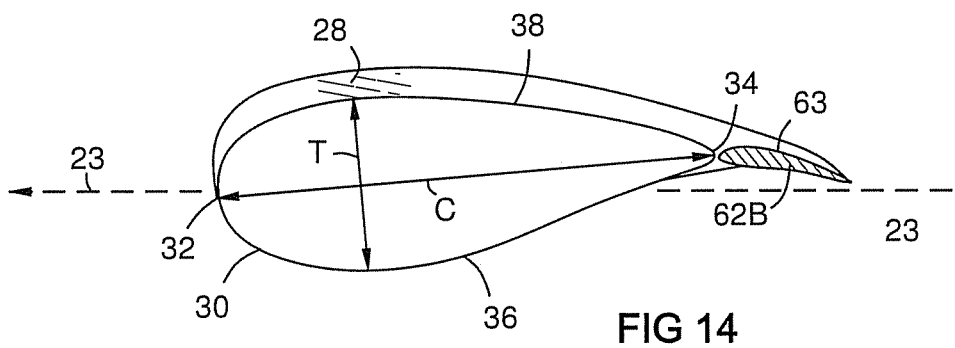
FIG. 14 shows a view as in FIG. 13 taken farther outboard on the blade.

FIG. 14 shows a portion of a wind turbine blade including a main element airfoil 30 that is farther outboard than shown in FIG. 13. In this location, the flap 62B can be closer to, or against, the trailing edge 34, because the main element airfoil 30 has a lower angle of attack, and no separation or recirculation. Here, there is more suction force on the flap and less force on the pressure side of the flap. The position of the flaps 62A, 62B, relative to the trailing edge 34 of the main airfoil, may vary along the spanwise length of the flap from an inboard position 62A with clearance aft and below the trailing edge 34, as in FIG. 13, to a further outboard position 62B directly behind the trailing edge 34 with little or no clearance, as shown in FIG. 14.

The flap 62, 62A, 62B works synergistically with the stall fence 28, because the flap reduces recirculation, thus reducing the required size of the stall fence 28. For additional synergy, the stall fence 28 may extend over the suction side 63 of the flap 62, 62A, 62B as shown. This prevents radial flow on the flap, with benefits similar to those provided by the stall fence 28 on the main airfoil 30.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind turbine blade comprising:
a main element;
a stall fence extending over at least most of a chordwise length of the main element; and
a slat mounted on the stall fence over a forward portion of a suction side of the main element;
wherein the slat is positioned to reduce a separation of airflow from the suction side of the airfoil; and
wherein the slat is twisted between an inboard end and an outboard end of the slat such that an angle between a chord of the slat and a rotation plane of the blade decreases with distance from a center of rotation of the blade.

2. The wind turbine blade of claim 1, further comprising an intermediate airfoil disposed on the stall fence over an intermediate position of the chordwise length of the main element.

3. The wind turbine blade of claim 1, wherein the slat inboard end is positioned over a leading edge of the wind turbine blade.

4. The wind turbine blade of claim 1, further comprising a flap disposed on the stall fence partially or completely behind a trailing edge of the main element.

5. The wind turbine blade of claim 4, wherein the stall fence extends over at least a portion of a suction side of the flap.

6. The wind turbine blade of claim 4, wherein at least a portion of a leading edge of the flap is disposed below the trailing edge of the main element such that a portion of an airflow flows from a pressure side of the main element to a suction side of the flap.

7. A wind turbine blade comprising:
a radially inboard portion with a stall fence extending over at least most of a chordwise length of a suction side of the blade; and
an aerodynamic slat mounted on and across the stall fence with a clearance over a forward portion of the suction side of the blade effective to reduce a separation of an airflow over the suction side of the airfoil;
wherein the slat is twisted between an inboard end and an outboard end of the slat such that an angle between a chord of the slat and a rotation plane of the blade decreases with distance from a center of rotation of the blade.

8. The wind turbine blade of claim 7, wherein the stall fence is at least as tall as an aerodynamic boundary layer on the suction side of the blade.

9. The wind turbine blade of claim 7, wherein the stall fence has a median height of 2-8% of a chord length of the blade at the stall fence, and the stall fence has a height under the slat of 4-12% of said chord length, defining the clearance of the slat.

10. The wind turbine blade of claim 7, wherein the stall fence varies gradually in height from a maximum height under the slat to a lesser height remote from under the slat.

11. The wind turbine blade of claim 7, wherein the stall fence extends behind the trailing edge of the blade.

12. The wind turbine blade of claim 11, further comprising a flap disposed on the stall fence partially or completely behind the trailing edge.

13. The wind turbine blade of claim 7, wherein the slat extends beyond the fence in both radial directions by at least a median height of the fence.

14. A wind turbine blade comprising:
a radially inboard portion with a plurality of chordwise stall fences extending over at least most of a chordwise length of a suction side of a main element of the blade; and
an aerodynamic slat mounted on and across the stall fences with a clearance over a forward portion of the suction side of the main element that is effective to reduce an airflow separation over the suction side of the airfoil;
wherein the slat is twisted between an inboard end and an outboard end of the slat such that an angle between a chord of the slat and a rotation plane of the blade decreases with distance from a center of rotation of the blade.

15. The wind turbine blade of claim 14, wherein each of the stall fences extends behind a trailing edge of the main element, and further comprising a flap disposed on the stall fences partially or completely behind the trailing edge.

16. The wind turbine blade of claim 15, further comprising at least a portion of a leading edge of the flap being disposed below the trailing edge of the main element such that a portion of an airflow flows from a pressure side of the main element to a suction side of the flap.

17. The wind turbine blade of claim 1, wherein the twist of the slat causes the inboard end of the slat to be positioned over the leading edge of the blade, and the outboard end of the slat to be positioned farther back from the leading edge.

18. The wind turbine blade of claim 7, wherein the twist of the slat causes the inboard end of the slat to be positioned more toward or over the leading edge of the blade, and the outboard end of the slat to be positioned farther back from the leading edge.

* * * * *